(12) United States Patent
Boguszewski et al.

(10) Patent No.: US 11,163,968 B1
(45) Date of Patent: Nov. 2, 2021

(54) PACKAGE IDENTIFICATION USING A SHIPPING LABEL FINGERPRINT

(71) Applicant: Amazon Technologies, Inc., Seattle, WA (US)

(72) Inventors: Pawel Boguszewski, Edmonds, WA (US); Prabhu Annabathula, Snoqualmie, WA (US)

(73) Assignee: Amazon Technologies, Inc., Seattle, WA (US)

( * ) Notice: Subject to any disclaimer, the term of this patent is extended or adjusted under 35 U.S.C. 154(b) by 175 days.

(21) Appl. No.: 16/278,656

(22) Filed: Feb. 18, 2019

(51) Int. Cl.
*G06K 7/10* (2006.01)
*G06K 7/14* (2006.01)
*B65G 1/137* (2006.01)

(52) U.S. Cl.
CPC ............ *G06K 7/1443* (2013.01); *B65G 1/137* (2013.01); *G06K 7/1447* (2013.01); *G06K 7/1495* (2013.01)

(58) Field of Classification Search
CPC .. G06K 7/1443; G06K 7/1447; G06K 7/1495; B65G 1/137
USPC .......................... 235/462.24, 375, 383, 385
See application file for complete search history.

(56) References Cited

U.S. PATENT DOCUMENTS 5,151,684 A * 9/1992 Johnsen ........... G06K 19/07703
340/5.92

* cited by examiner

*Primary Examiner* — Thien M Le
(74) *Attorney, Agent, or Firm* — Patterson + Sheridan, LLP

(57) ABSTRACT

Techniques are described for identifying packages based on shipping label fingerprints. A first camera captures a first image of a label on a package when the package is in a first location within a warehouse. A first representation of the first image is generated. A second camera captures a second image of a label on a package when the package is in a second location within the warehouse. A second representation of the second image is generated. The second representation is matched to the first representation to identify the package placed in the second location.

20 Claims, 12 Drawing Sheets

PACKAGE IDENTIFICATION USING A SHIPPING LABEL FINGERPRINT

BACKGROUND

The present disclosure generally relates to identifying packages, and more specifically, to using a shipping label fingerprint to identify packages placed in a particular location (e.g., pallet in a facility).

Shipping packages typically involves moving the packages to different locations in a facility (e.g., shipping warehouse, storehouse, distribution center, etc.) in preparation for the packages being loaded onto trucks. For example, an associate may sort packages by moving the packages from a common area into one of multiple storage areas that corresponds to a destination of the package. Each of the storage areas may correspond to a different destination or region such as different zip codes, different facilities, different shipping companies, etc.

A facility can deploy camera devices near a given storage area and use the camera devices for package identification. For example, the camera devices may capture images of barcodes or other identifying information on a package to identify the package and determine whether the package is in the correct storage area. However, as a facility can process vast quantities of packages for shipment, in many situations it is critical that any such facility that uses camera devices to identify packages be capable of operating at a very high rate of success. For example, if a facility has a high rate of mis-identifying packages, such failures could significantly delay the workflow of the facility.

BRIEF DESCRIPTION OF DRAWINGS

Various embodiments in accordance with the present disclosure will be described with reference to the drawings, where like designations denote like elements.

DETAILED DESCRIPTION

Figure 1:
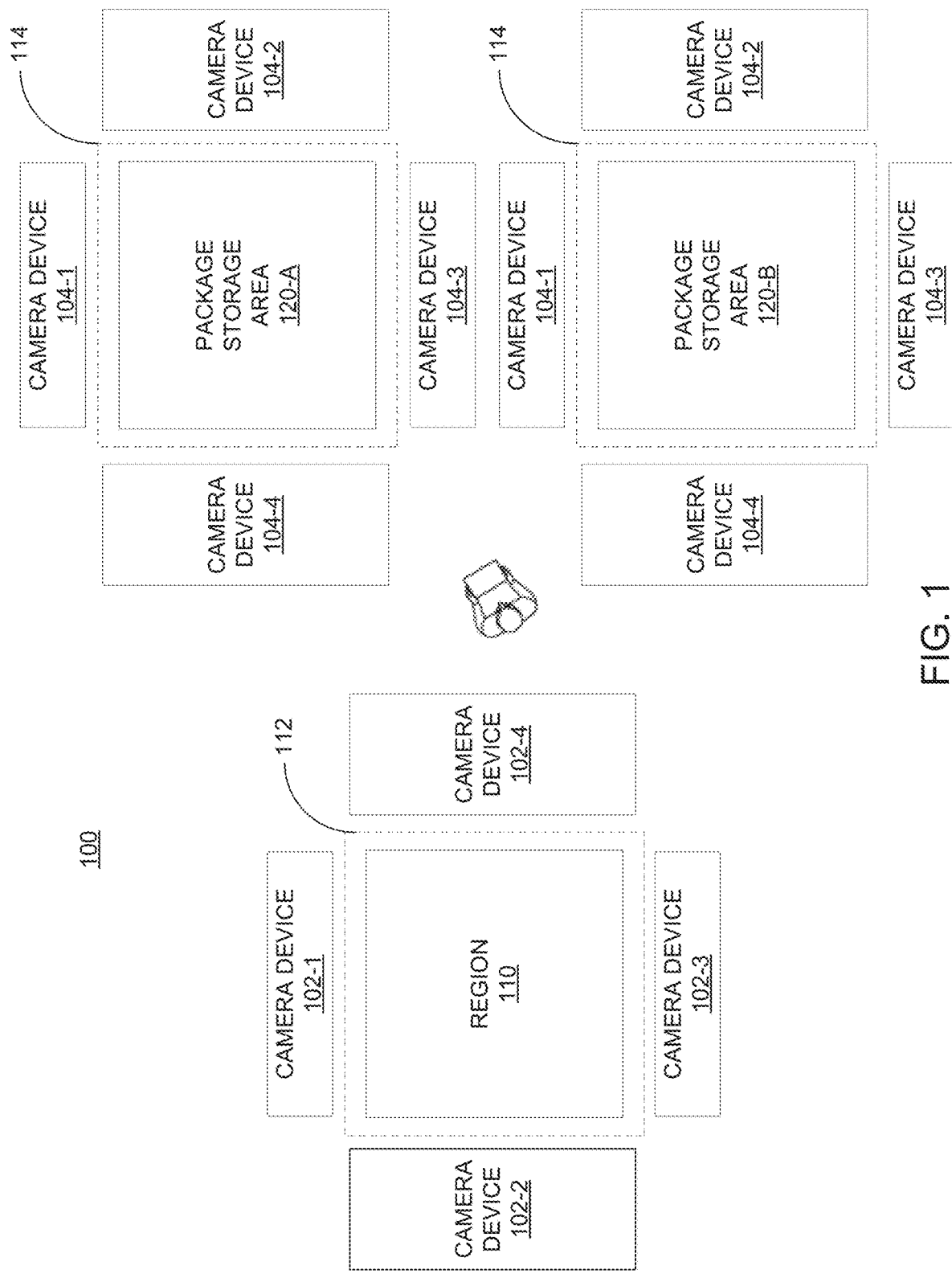
FIG. 1 is a block diagram illustrating a sorting environment configured with camera devices, according to one embodiment.

A facility (e.g., shipping warehouse) can use a computer vision system to process images captured by a camera(s) and determine whether the packages are located in the correct package storage areas. For example, a conventional computer vision system generally identifies and reads a barcode on the packages to determine their correct destinations. In order to reliably and accurately read the barcode on the packages, a conventional computer vision system employs multiple high resolution cameras disposed above the package storage areas, e.g., to capture high resolution images of the barcodes. For example, the computer vision system uses the high resolution images to read one dimensional (1D) or two dimensional (2D) barcodes on the packages in order to resolve the shipment (or shipping) identities (IDs) for the packages. Identifying packages in this manner, however, can be significantly cost-intensive and involve high amounts of data processing.

Embodiments herein describe a package identification system that identifies packages placed in a storage area (e.g., pallet location) within a facility (e.g., shipping warehouse) based on shipping label footprints associated with the different packages. In one embodiment, the package identification system includes a first set of camera devices disposed above (or in proximity to) a first location (e.g., package retrieval area, loading dock, conveyor belt, etc.) and a second set of camera devices disposed above (or in proximity to) a second location (e.g., package storage area). The first set of camera devices are configured to capture images of packages at the first location and the second set of camera devices are configured to capture images of packages placed in the second location.

An associate may be tasked with sorting packages into different storage areas depending on the destination of the packages. For example, each package may include a shipping label that indicates in which package storage area (e.g., pallet location) the package should be stored. The associate may retrieve a package from the packing retrieval area and carry the package to a particular storage area based on its shipping label. In one embodiment, a first camera device in the first set of camera devices captures a high quality image of the shipping label on the package when the package is in the package retrieval area. The first camera device uses the high quality image to generate a first fingerprint of the shipping label. For example, the first fingerprint may be a compressed representation of the high quality image of the shipping label. The first camera device can determine identifying information (e.g., shipment ID) of the package based on the high quality image and associate (or link) the identifying information of the package with the first fingerprint. The first camera device can send the first fingerprint along with the identifying information to the second set of camera devices (e.g., located at the package storage area) and/or store the first fingerprint along with the identifying information in a storage location that is accessible by the first and second sets of camera devices.

After the first fingerprint is generated, a second camera in the second set of camera devices captures a low quality image of the shipping label on the package when the package is in the package storage area, e.g., after the associate has placed the package in the package storage area. The second camera device uses the low quality image to generate a second fingerprint of the shipping label. After the second fingerprint is generated, the second camera device compares the second fingerprint to a set of first fingerprints stored in the package identification system. Once a match is found between the second fingerprint and one of the first fingerprints, the second camera device can identify the package placed in the package storage area. For example, the second camera device can determine the identifying information (e.g., shipment ID) of the package from the identifying information associated with the first fingerprint that matches the second fingerprint, and verify the package storage area based on the shipment ID. In this manner, embodiments significantly reduce the complexity and cost associated with conventional computer vision systems, which generally use higher resolution cameras at the package storage area to read barcodes placed on packages.

Note, as used herein, the "quality" of an image may refer to (or be based on) one or more image attributes, such as sharpness, noise, dynamic range, resolution, contrast, etc. A "high quality" image, for example, may include a higher sharpness, lower noise, higher dynamic range, higher resolution, etc. relative to a "low quality" image. Similarly, a "low quality" image, for example, may include a lower sharpness, higher noise, lower dynamic range, lower resolution, etc., relative to a "high quality" image.

FIG. 1 is a block diagram illustrating a sorting environment configured with camera devices, according to one embodiment. As shown, the warehouse environment 100 includes a region 110, which is monitored by camera devices 102 1-4, and package storage areas 120-A and 120-B, which are each monitored by camera devices 104 1-4. As described in further detail below, each of the camera devices 102 1-4 and 104 1-4 may use a package identification component that analyzes images captured by the camera devices 102 and 104 for package identification. In one embodiment, each of the camera devices 102 1-4 and 104 1-4 may be configured with a package identification component. In another embodiment, the package identification component may be located in one or more computing systems (e.g., in the cloud). The region 110 is representative of a variety of areas in the warehouse environment 100 where packages can be identified and/or retrieved. In one embodiment, the region 110 can be a package retrieval area in which packages are held until they are retrieved by an associate. For example, the region 110 can include one or more conveyor belts that bring the packages to the associates from other areas in the warehouse environment 100. In some embodiments, the region 110 can be an area where packages are unloaded from a trailer (or truck). The region 110 is surrounded by a border 112, which is used to detect when a package has entered the region 110. For example, the border 112 can be implemented as a presence sensor (e.g., light curtain) on a conveyor belt to detect objects on the conveyor belt.

The package storage areas 120 A-B can be any suitable apparatus with a form factor for holding multiple shipping packages. For example, the package storage areas 120 A-B can include containers (e.g., a pallet box), a pallet, bag, bin, etc. In another example, the package storage areas 120 A-B can include a defined region (e.g., a staging area) on the floor of the warehouse environment 100 rather than being placed in a holding apparatus. In some examples, tape or paint may be used to define the boundaries of the staging areas which the associate can use to place the package in the correct region. As used herein, a "package storage area" can include a defined region (e.g., a staging area) or a container that has a form factor for storing multiple packages (e.g., pallet box, pallet, etc.).

An associate can retrieve the packages from the conveyor belt(s) and use a label on the package to identify a package storage area 120 for the package. For example, each package storage area 120 A-B may represent a different destination, such as different zip codes, different warehouses, different shipping companies, etc. In one example, the label on the package includes a pallet number indicating in which of the package storage areas 120 A-B the associate should place the package. In another example, the associate may match a zip code on the label to a corresponding one of the package storage areas 120 A-B. In yet another example, the label may include a color stamp which corresponds to one of the package storage areas 120 A-B. Note the embodiments disclosed herein are not limited to any particular technique for indicating to the associate the appropriate package storage area 120. Each package storage area 120 A-B is surrounded by a border 114. In one example, the border 114 can include a visible border, such as colored tape or another material affixed to the floor around the package storage area 120. In another example, the border 114 can be implemented as a presence sensor (e.g., light curtain) that can detect when a package is placed into one of the package storage areas 120 A-B.

The warehouse environment 100 includes camera devices 102 1-4 disposed in proximity to the region 110. In one embodiment, assuming the region 110 includes one or more conveyor belts, the camera devices 102 1-4 can be placed above (or in any other suitable location on) the conveyor belt(s) in order to capture images of shipping labels on the packages on the conveyor belt(s). The camera devices 102 1-4 may be placed sufficiently close to the region 110 to allow the camera devices 102 1-4 to capture high quality images of shipping labels on the packages in the region 110 while providing sufficient clearance for packages arriving in the region 110.

Each camera device 102 1-4 may have corresponding field of view that represents an area of the region 110 in the images captured by the camera device 102. In some embodiments, each camera device 102 1-4 is configured to automatically capture an image of a package shipping label (e.g., in the camera device's field of view) once the package is detected in the region 110. In some embodiments, an associate can expose each package to one of the camera device's 102 1-4, e.g., prior to removing the package from the region 110, in order to allow the camera device 102 to capture an image of the package shipping label. Note that while four camera devices 102 are shown in proximity to the region 110, the embodiments are not limited to any particular number of camera devices 102.

The warehouse environment 100 further includes camera devices 104 1-4 disposed above each package storage area 120A and 120B. In one embodiment, the camera devices 104 1-4 may be disposed at a height that provides sufficient clearance for stacking multiple packages in the package storage areas 120 A-B, and for vehicles and associates moving on the ground of the warehouse environment 100. In one particular embodiment, the camera devices 104 1-4 at each package storage area 120 A-B may be disposed at least twelve feet above the package storage area and/or the floor of the warehouse environment 100. Compared to the quality of images captured by the camera devices 102 1-4, the camera devices 104 1-4 are configured to capture lower quality images of package shipping labels for packages placed in the package storage areas 120 A-B. For example, the camera devices 104 1-4 are configured to capture images at a lower resolution compared to the camera devices 102 1-4. In some embodiments, the camera devices 102 1-4 and camera devices 104 1-4 can be configured to capture images in different operating conditions. For example, the operating conditions (e.g., lighting conditions, temperature, exposure, white balance, etc.) at the region 110 may be different than the operating conditions at the package storage areas 120A and/or 120B.

Each camera device 104 1-4 may have a corresponding field of view that represents an area of the package storage area 120 in the images captured by the camera device 104. In some embodiments, each camera device 104 1-4 is configured to automatically capture an image of a package shipping label (e.g., in the camera device's field of view) once the package is detected in the package storage area 120. In some embodiments, an associate can expose each package to one of the camera device's 104 1-4, e.g., when placing the package in the package storage area 120, in order to allow the camera device 104 to capture an image of the package shipping label. Note that while four camera devices 104 are shown in proximity to each package storage area 120 A-B, the embodiments are not limited to any particular number of camera devices 104. Further, while FIG. 1 depicts the region 110 and each package storage area 120A and 120B with four camera devices, those of ordinary skill in the art should understand that the number of camera devices 102 may be different than the number of camera devices 104.

Figure 2A:
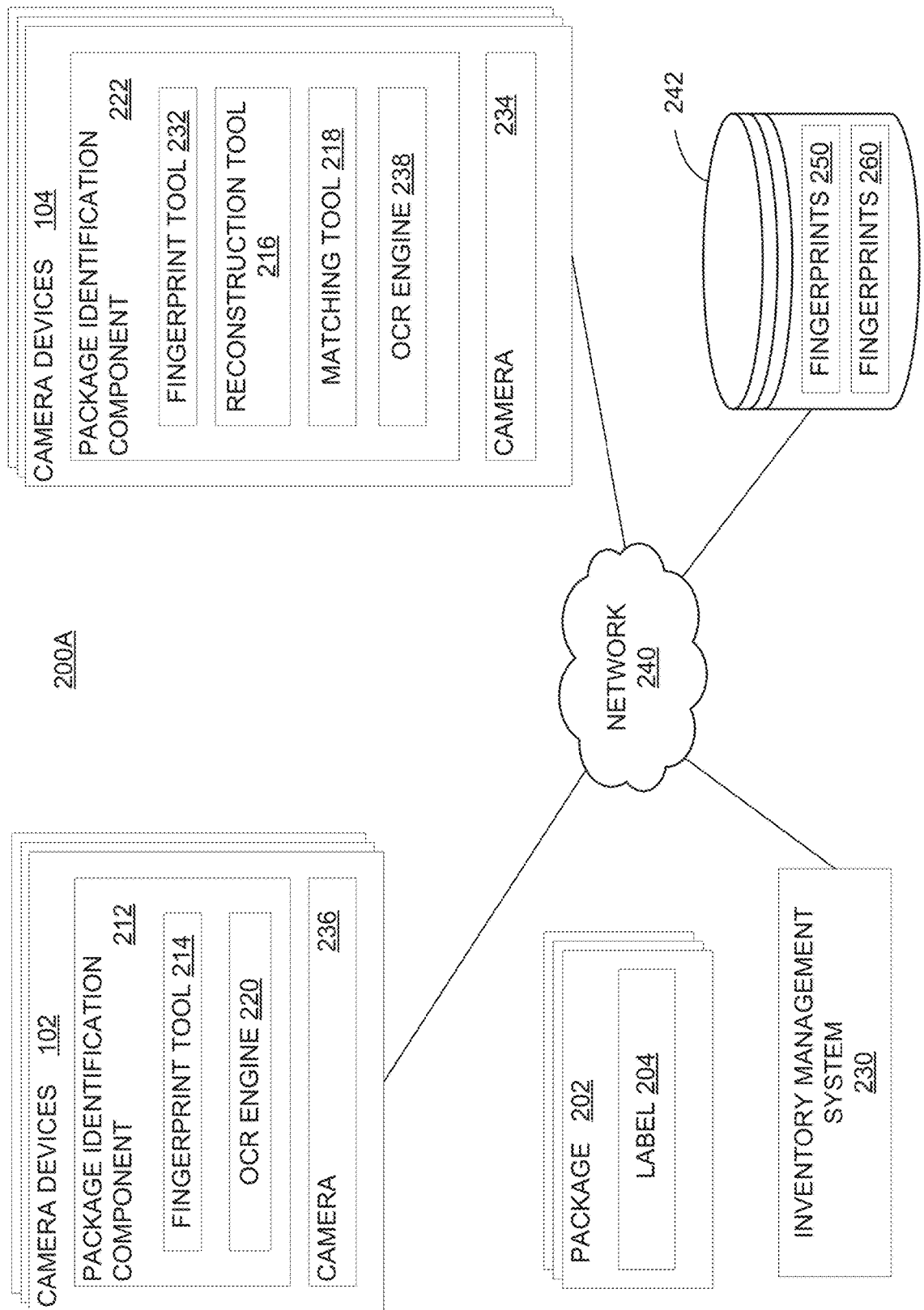
FIG. 2A is a block diagram of a system that performs package identification, according to one embodiment.

FIG. 2A is a block diagram of a system 200A that uses package identification components 212 and 222 to identify packages being sorted into package storage areas 120, according to one embodiment. The system 200A includes camera devices 102, camera devices 104, an inventory management system 230, and a storage location 242, all interconnected via a network 240. Camera devices 102 and 104 are representative of a variety of computing devices (or systems), including a laptop computer, mobile computer (e.g., a tablet or a smartphone), digital media player, etc. The network 240, in general, may be a wide area network (WAN), a local area network (LAN), a wireless LAN, a personal area network (PAN), a cellular network, etc. In a particular environment, the network 240 is the Internet.

As noted, conventional computer vision systems generally read barcode(s) located on the label 204 or elsewhere on the package 202 in order to identify the package 202 and determine whether the package 202 is properly sorted (e.g., placed in the correct package storage area 120). In order to read such barcodes, these systems typically have to use multiple high resolution cameras to capture high resolution images of the barcodes. In addition, such systems typically have to use complex data processing methods in order to process the high resolution images. Rather than use high resolution images of barcodes to perform package identification, embodiments herein generate digital fingerprints of the label 204 from (different quality) images of the label 204 captured at two different locations within the warehouse environment 100 and use the digital fingerprints to identify the package 202. By doing so, embodiments can reduce the cost and complexity associated with conventional computer vision systems.

Figure 3A:
FIG. 3A illustrates an example of quality of an image captured by a camera at a first location, according to one embodiment.

In this particular embodiment, each of the camera devices 102 includes a package identification component 212 and a camera 236. The camera 236 is configured to capture high quality images (relative to low quality images captured by the camera 234) of shipping labels 204 on packages 202 (e.g., when the packages 202 are in the region 110). For example, the camera 236 may be a high resolution camera that is disposed sufficiently near the region 110 in order to capture a high quality (e.g., high resolution) image of the shipping label. FIG. 3A illustrates one example of the quality of an image 302A of a shipping label that can be captured by the camera 236.

The package identification component 212 can be a software application or a combination of software and hardware elements that receives images captured by the camera 236 and processes these images to generate fingerprints (also referred to as compressed representations) of the images for subsequent package identification (e.g., by the package identification component 222). In one embodiment, the package identification component 212 processes these images to identify a label 204 on the package 202 (e.g., a shipping label). The label 204 may include a mailing address, a barcode (e.g., indicating the shipment ID), and/or an indication (e.g., sort code) of the package storage area 120 so that the associate knows where to place the package 202.

In this embodiment, the package identification component 212 includes a fingerprint tool 214 and an optical character recognition (OCR) engine 220. The fingerprint tool 214 receives a high quality image of the label 204 captured by the camera 236 (e.g., when the package 202 is in the region 110) and generates a first fingerprint 250 of the label 204. The first fingerprint 250 is generally a compressed representation of the label 204 that is associated with the label 204. In one embodiment, the first fingerprint 250 includes a set of features extracted from the label 204. For example, the set of features can include visual and/or geometric features (e.g., ridges, edges, pixel value intensity changes, etc.) associated with the label 204. In one embodiment, once the first fingerprint 250 is generated, the fingerprint tool 214 sends the first fingerprint 250 to the set of camera devices 104. In one embodiment, once the first fingerprint 250 is generated, the fingerprint tool 214 can store the first fingerprint 250 in the storage location 242 (e.g., database). In some embodiments, the fingerprint tool 214 can send and/or store the first fingerprint 250 along with the shipment ID (or other identifying information) corresponding to the package associated with the first fingerprint 250. In one embodiment, the fingerprint tool 214 may implement an encoding layer(s) of an auto encoder, e.g., to generate the fingerprint 250.

In one embodiment, the OCR engine 220 is configured to extract text from the high quality image captured by the camera 236. For example, the OCR engine 220 can extract particular text, such as the address, sort code, tracking number, etc., from the high quality image. In general, the OCR engine 220 can extract any information from the label that is suitable for identifying the package 202. Once extracted, the OCR engine 220 can send the text to the set of camera devices 104. Note, although not shown, each camera device 102 may include any number of processors and memory. For example, the processors can include a single computer, such as a server, or can represent multiple communicatively coupled computers such as a data center or cloud computing system. In addition, although not shown, each camera device 102 may include storage, I/O devices, and a network interface. The storage may be a combination of a fixed and/or removable storage, such as fixed disc drives, removable memory cards, optical storage, network attached storage (NAS), or storage-area-network (SAN). The network interface may be any type of network communications interface that allows the camera device(s) 102 to communicate with other computers and/or components in the system 200A via a data communications network (e.g., network 240).

Figure 3B:
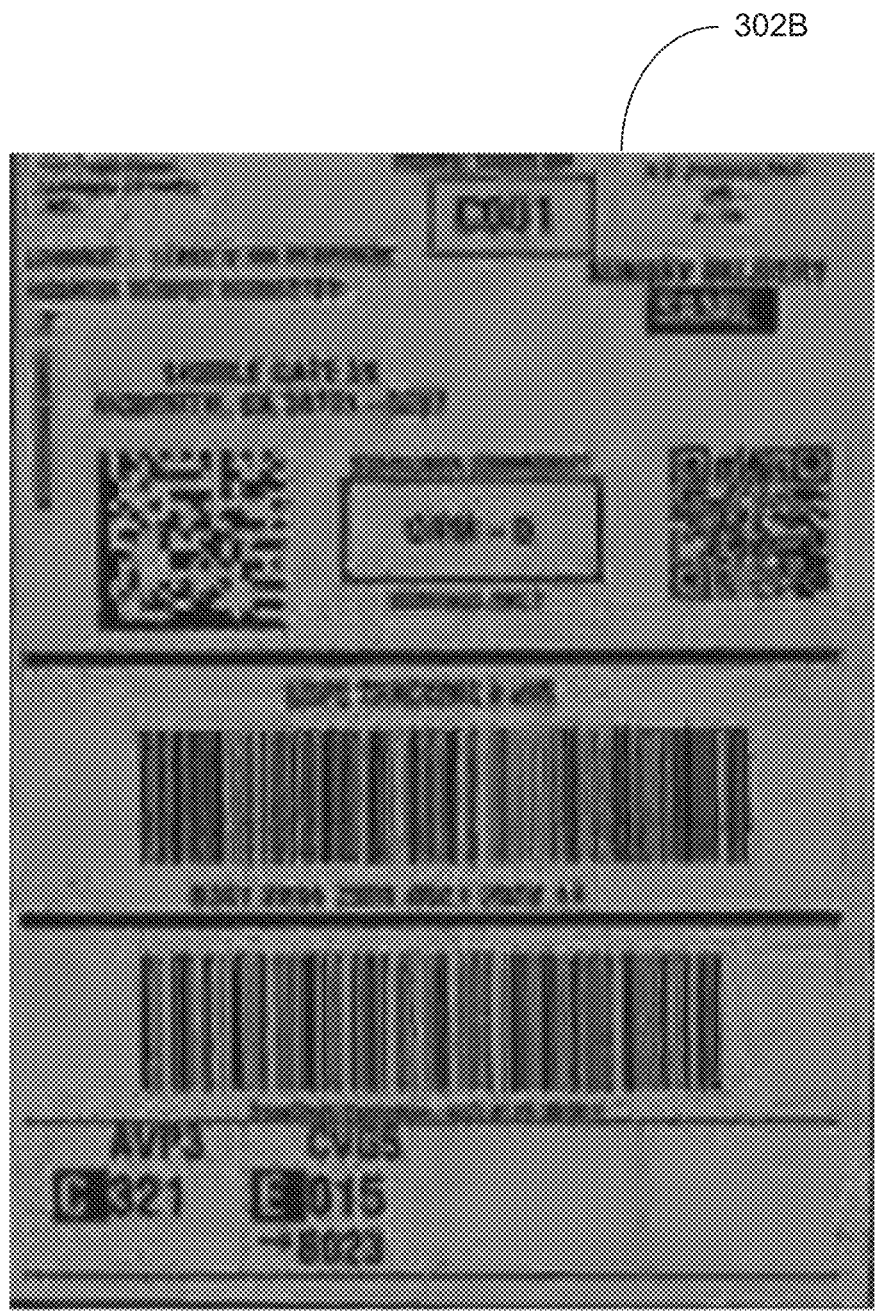
FIG. 3B illustrates an example of quality of an image captured by a camera at a second location, according to one embodiment.

As also shown, each of the camera devices 104 includes a package identification component 222 and a camera 234. The camera 234 is configured to capture low quality images (relative to the high quality images captured by the camera 236) of shipping labels 204 on packages 202 (e.g., when the packages 202 are in the package storage area 120). For example, the camera 234 may be a low resolution camera that is disposed at a height above the package storage area 120 (e.g., at least twelve feet above ground, or at another height greater/lower than twelve feet above ground). FIG. 3B illustrates one example of the quality of an image 302B of a shipping label that can be captured by the camera 234.

The package identification component 222 can be a software application or a combination of software and hardware elements that receives images captured by the camera 234 and processes these images to generate fingerprints (also referred to as compressed representations) of the images for subsequent package identification. For example, similar to the package identification component 212, the package identification component 222 can process these images to identify the label 204 on the package 202. In this embodiment, the package identification component 222 includes a fingerprint tool 232, a reconstruction tool 216, a matching tool 218, and an OCR engine 238. The fingerprint tool 232 may operate similarly to the fingerprint tool 214. For example, the fingerprint tool 232 receives a low quality image of the label 204 captured by the camera 234 (e.g., when the package 202 is in the package storage area 120) and generates a second fingerprint 260 of the label 204. The second fingerprint 260 is generally a compressed representation of the label 204 that is associated with the label 204. For example, the second fingerprint 260 can include a set of features (e.g., visual and/or geometric features) extracted from the label 204. Once the second fingerprint 260 is generated, the fingerprint tool 232 can store the second fingerprint 260 in the storage location 242.

In one embodiment, the reconstruction tool 216 is configured to reconstruct an image of the label 204 from the second fingerprint 260. For example, as described in more detail below, the reconstruction tool 216 may use the set of features of the second fingerprint 260 to restore the image of the label 204. In one embodiment, the fingerprint tool 232 and the reconstruction tool 216 may be implemented as an auto encoder. For example, the fingerprint tool 232 may implement an encoding layer(s) of the auto encoder to generate the second fingerprint 260 and the reconstruction tool 216 may implement a decoding layer(s) of the auto encoder to reconstruct the image of the label 204 from the second fingerprint 260. In one embodiment, the fingerprint tool 232 can send the second fingerprint 260 to the matching tool 218 and/or to the storage location 242. Similarly, the reconstruction tool 216 can send the reconstructed image to the OCR engine 238 and/or to the storage location 242.

In one embodiment, the OCR engine 238 is configured to extract text from the image reconstructed with the reconstruction tool 216. For example, similar to the OCR engine 220, the OCR engine 238 can extract particular text, such as the address, sort code, tracking number, etc. from the reconstructed image. Once extracted, the OCR engine 238 can send the text to the matching tool 218.

In one embodiment, the matching tool 218 is configured to compare the second fingerprint 260 to the set of first fingerprints 250 stored in the storage location 242 to determine if there is a match. For example, the matching tool 218 may determine there is a match if the amount of difference between the second fingerprint 260 and one of the first fingerprints 250 is below a threshold (or within a threshold range). Once the matching tool 218 determines there is a match, the matching tool 218 can determine the shipment ID of the package 202 (e.g., from the shipment ID associated with the first fingerprint that matches the second fingerprint 260) to identify the package. The matching tool 218 can use the shipment ID to determine if the package 202 is in the correct package storage area 120. For example, the matching tool 218 can send a request to the inventory management system 230 for inventory information associated with the shipment ID of the package 202 (e.g., shipping destination, package storage area location, etc.). In response, the inventory management system 230 can provide the inventory information to the matching tool 218.

In some embodiments, to aid in identifying a package 202, the matching tool 218 can perform matching using the text received from the OCR engines 220 and 238. For example, the matching tool 218 can look for text patterns (e.g., address information) between the sets of text extracted from the OCR engines 220 and 238 to determine if there is a match. Note, although not shown, each camera device 104 may include any number of processors and memory. For example, the processors can include a single computer, such as a server, or can represent multiple communicatively coupled computers such as a data center or cloud computing system. In addition, although not shown, each camera device 104 may include storage, I/O devices, and a network interface. The storage may be a combination of a fixed and/or removable storage, such as fixed disc drives, removable memory cards, optical storage, NAS, or SAN. The network interface may be any type of network communications interface that allows the camera device(s) 104 to communicate with other computers and/or components in the system 200A via a data communications network (e.g., network 240).

Note that FIG. 2A illustrates a reference example of a system in which the techniques presented herein can be used to identify packages being sorted into package storage areas and that the techniques presented herein can also be used in other system deployments. For example, while FIG. 2A illustrates the package identification component 212 within a camera device 102 and the package identification component 222 within a camera device 104, those of ordinary skill in the art will recognize that the various modules within the package identification component 212 and/or the package identification component 222 can be included in a single computing device (e.g., as shown in FIG. 2B) or distributed across one or more computing devices (e.g., as shown in FIG. 2C).

Figure 2B:
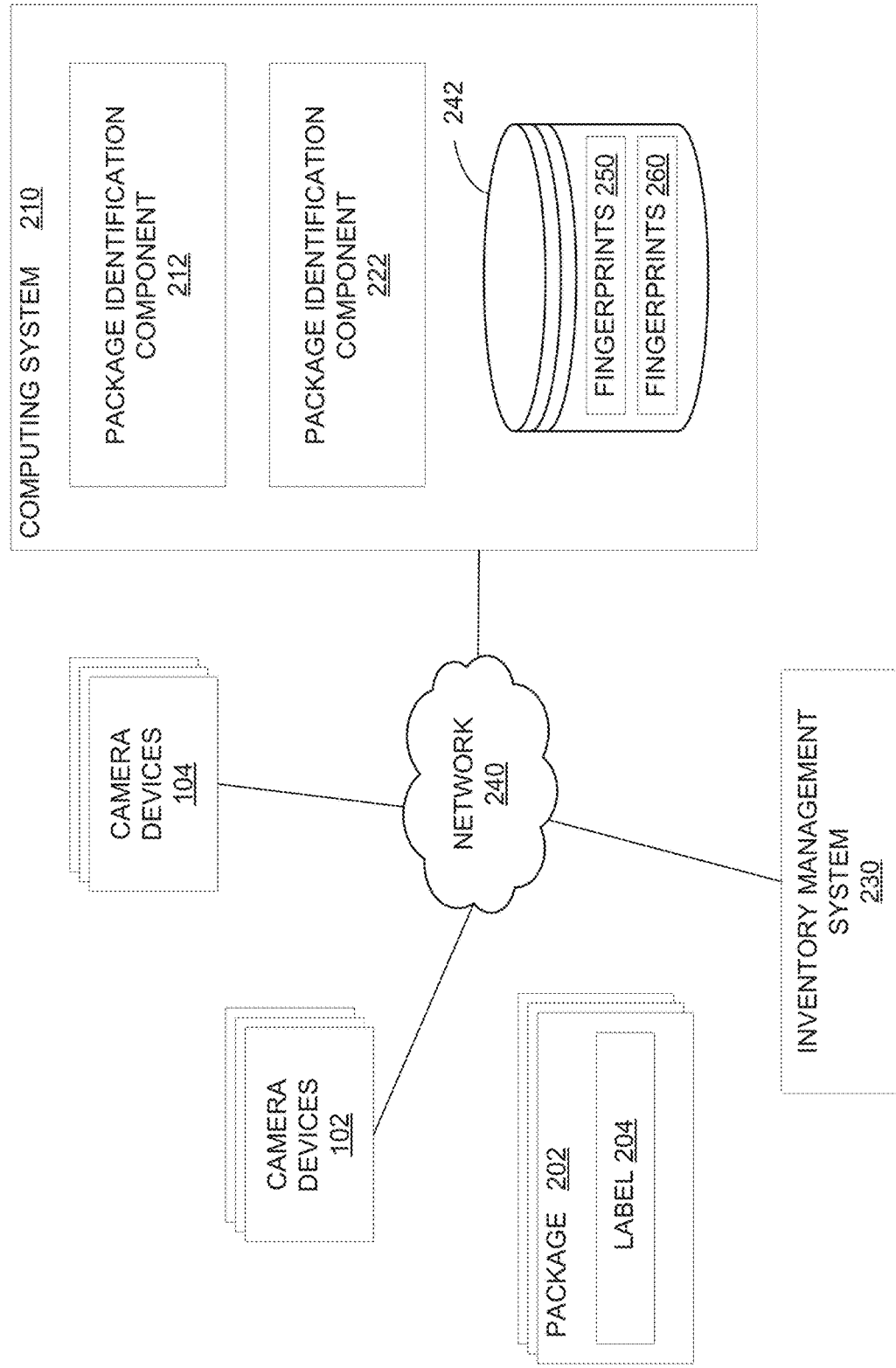
FIG. 2B is a block diagram of another system that performs package identification, according to one embodiment.

FIG. 2B, for example, is a block diagram of a system 200B that uses package identification components 212 and 222 to identify packages being sorted into package storage areas 120, according to one embodiment. Compared to the system 200A, the system 200B includes a computing system 210, which includes the package identification components 212 and 222 and the storage location 242. In one embodiment, the computing system 210 can be a single computing system (e.g., with one or more processors, memory, storage, I/O devices, network interface, etc.). In one embodiment, the computing system 210 can include multiple computing systems located in a cloud environment.

Figure 2C:
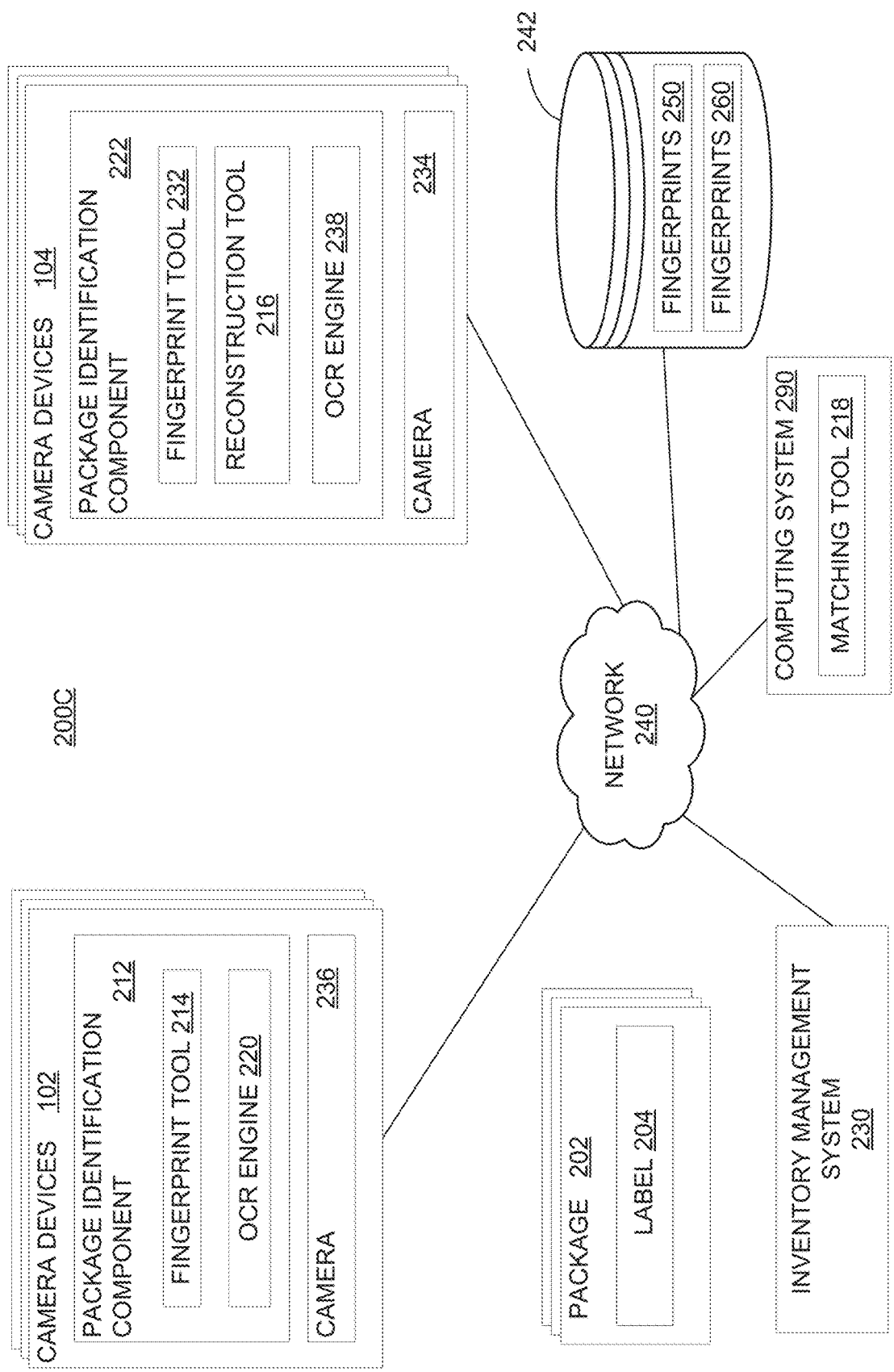
FIG. 2C is a block diagram of yet another system that performs package identification, according to one embodiment.

FIG. 2C, for example, is a block diagram of a system 200C that can identify packages being sorted into package storage areas 120, according to one embodiment. Compared to the system 200A, the system 200C includes a computing system 290, which includes the matching tool 218. In one embodiment, the computing system 290 can be a single computing system (e.g., with one or more processors, memory, storage, I/O devices, network interface, etc.). In one embodiment, the computing system 290 can include multiple computing systems located in a cloud environment.

Figure 4:
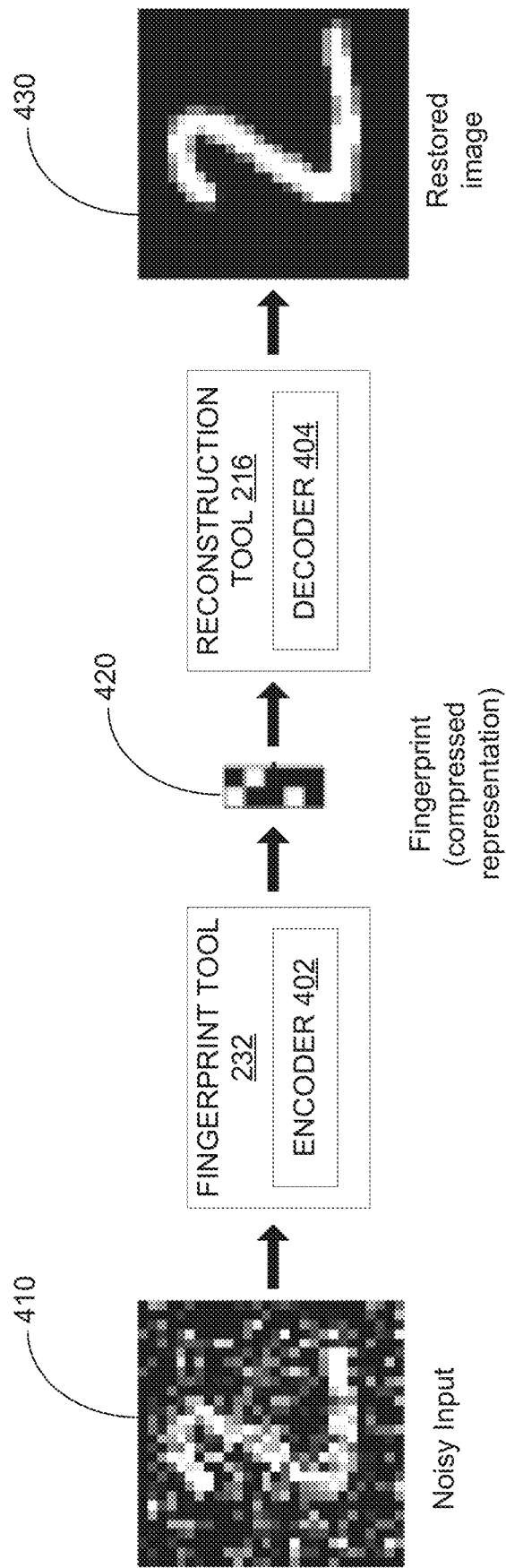
FIG. 4 is a block diagram of an example auto-encoder reconstructing an image from a noisy image, according to one embodiment.

FIG. 4 is a block diagram of an example auto-encoder reconstructing an image from a noisy image, according to one embodiment. In this example, the auto-encoder includes the fingerprint tool 232 and the reconstruction tool 216. The auto-encoder, in general, can be trained with machine learning techniques to learn the features and manifold of input images (e.g., image of label 204) that can be used to reconstruct the images. Here, the fingerprint tool 232 includes an encoder 402 and the reconstruction tool 216 includes a decoder 404. The encoder 402 is generally configured to receive an image and condense the size of the image into a small vector by performing a series of convolutions. The condensed vector represents the features of the image from which another image can be reconstructed. The decoder 404 is configured to apply a series of de-convolution layers to the condensed vector output from the encoder 402. This process enlarges the size of the image and restores it back to its original size.

In this particular embodiment, the fingerprint tool 232 receives a noisy and low quality image 410 (e.g., image of the number "2"). In one example, the image 410 is representative of the quality of images captured by the camera devices 104, e.g., at the package storage area 120. The fingerprint tool 232 uses the encoder 402 to generate the compressed representation 420 of the image 410. The compressed representation 420 includes a set of features extracted from the image 410. In one embodiment, the compressed representation 420 may include relevant features of the image 410 and may not include features associated with noise in the image 410. For example, the set of features may include edges, ridges, change in pixel intensity values, etc., associated with the "2" in the image 410 and may not include information of the noise surrounding the "2" in the image 410.

Figure 5:
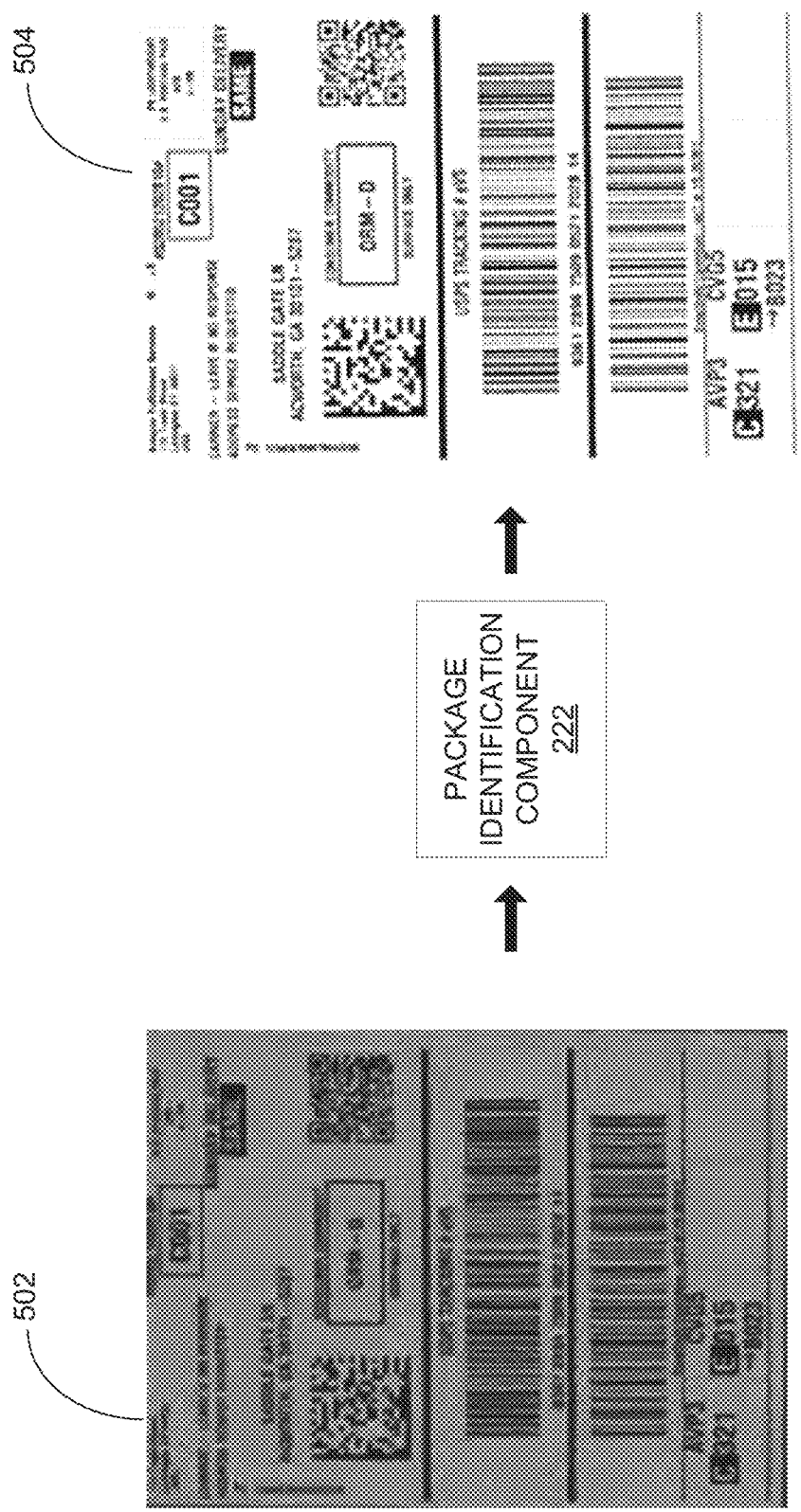
FIG. 5 illustrates an example of differences in quality between images of shipping labels captured at different locations, according to one embodiment.

The reconstruction tool 216 uses the decoder 404 to reconstruct an image 430 from the compressed representation 420. As shown, the reconstruction tool 216 is able to restore an (higher quality) image 430 that has less noise relative to the image 410. This is due, in part, to the compressed representation 420 including a set of features that are associated with the "2" in the image 410 and not the noise surrounding the "2" in the image 410. Embodiments can use the auto-encoder illustrated in FIG. 4 to match fingerprints and reconstruct images of shipping labels that have reduced noise compared to the images of the shipping labels captured by the camera devices 104. FIG. 5 illustrates one reference example of the differences in quality of the image 502 of a shipping label captured at the package storage area 120 and the reconstructed image 504 generated by the package identification component 222 (e.g., from the fingerprint of the image 502).

Figure 6:
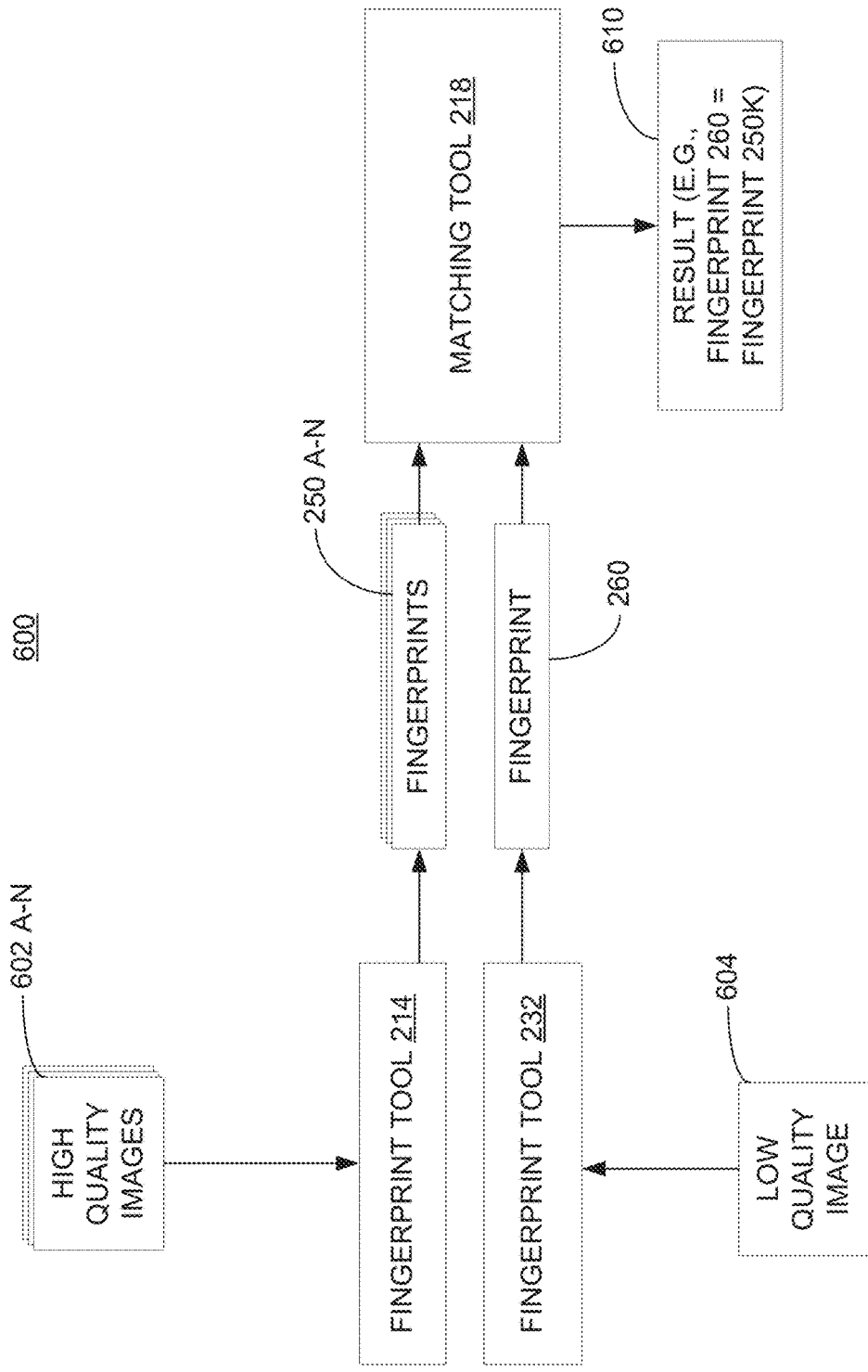
FIG. 6 is a block diagram illustrating an example workflow for performing package identification, according to one embodiment.

FIG. 6 is a block diagram illustrating an example workflow 600 for performing package identification, according to one embodiment. As shown, the fingerprint tool 214 receives multiple high quality images 602 A-N captured from the camera devices 102 located near the region 110. Although not shown, the fingerprint tool 214 may also receive identifying information (e.g., an identifier, such as a shipment ID) associated with each high quality image 602 A-N. In one embodiment, each high quality image 602 A-N is an image of a different shipping label on a different package in the region 110. As also shown, the fingerprint tool 232 receives a low quality image 604 captured from a camera device 104 located near the package storage area 120. In one embodiment, the low quality image 604 is an image of a shipping label on one of the packages that was previously located in the region 110.

The fingerprint tool 214 extracts a set of features (represented as fingerprints 250 A-N) from each high quality image 602 A-N. Although not shown, the fingerprint tool 214 may store the fingerprints 250 A-N and/or the identifying information in a storage location (e.g., storage location 242). The fingerprint tool 232 also extracts a set of features (represented as fingerprint 260) from the low quality image 604. The matching tool 218 receives the fingerprints 250 A-N and the fingerprint 260, and compares the fingerprint 260 to the fingerprints 250 A-N to determine if there is a match. In one embodiment, the matching tool 218 can use a matching function (e.g., distance function) to determine which of the fingerprints 250 A-N is closest to the fingerprint 260. The matching tool 218 then returns a result 610 based on the matching function. Here, for example, the matching tool 218 determines that the fingerprint 260 matches fingerprint 250K.

Figure 7:
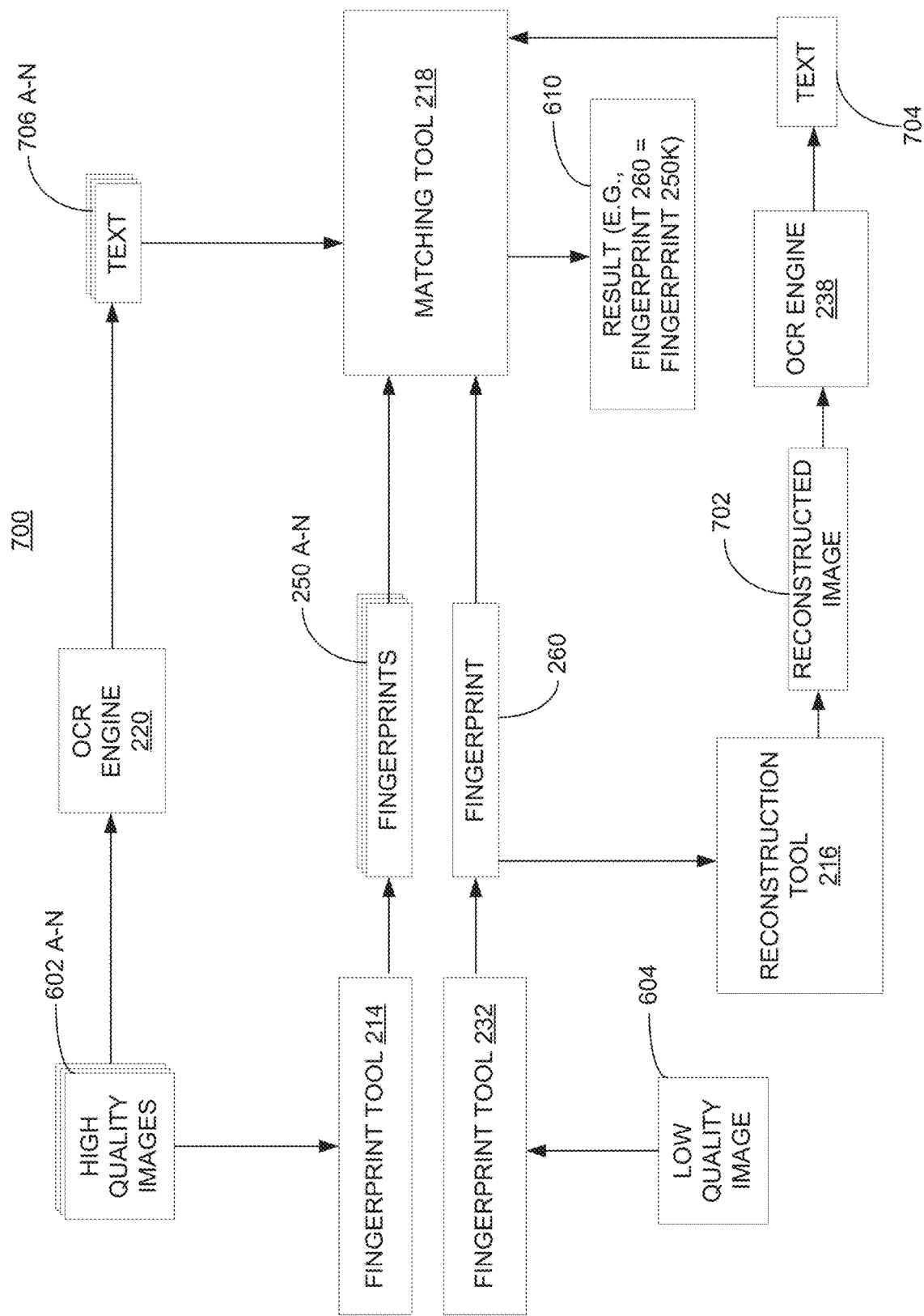
FIG. 7 is a block diagram illustrating another example workflow for performing package identification, according to one embodiment.

FIG. 7 is a block diagram illustrating another example workflow 700 for performing package identification, according to one embodiment. Compared to the workflow 600, the workflow 700 may incorporate OCR matching on the high quality images and the reconstructed low quality image to aid in package identification. For example, the additional OCR matching can increase the likelihood that the matching tool 218 uniquely identifies a package that is placed in the package storage area 120. As shown, once the fingerprint 260 is generated, the reconstruction tool 216 uses the fingerprint 260 to generate a reconstructed image 702 (corresponding to the low quality image 604). This reconstructed image 702 is then sent to the OCR engine 238, which extracts text 704 from the reconstructed image 702. Examples of the text 704 can include address information, sort code information, shipment IDs, etc. The text 704 is then sent to the matching tool 218.

As shown, the OCR engine 220 also extracts text 706 A-N from the high quality images 602 A-N, and sends the extracted text 706 A-N to the matching tool 218. In one embodiment, the matching tool 218 may look for unique text patterns, such as sort code information, address information, etc. to determine if there is a match between the fingerprint 260 and one of the fingerprints 250 A-N. In one embodiment, the matching tool 218 can also perform matching between the text 704 and the text 706 A-N as an additional check on the result 610. For example, the matching tool 218 may confirm that the extracted text 704 from the reconstructed image 702 corresponds to the extracted text 706K from high quality image 602K.

Figure 8:
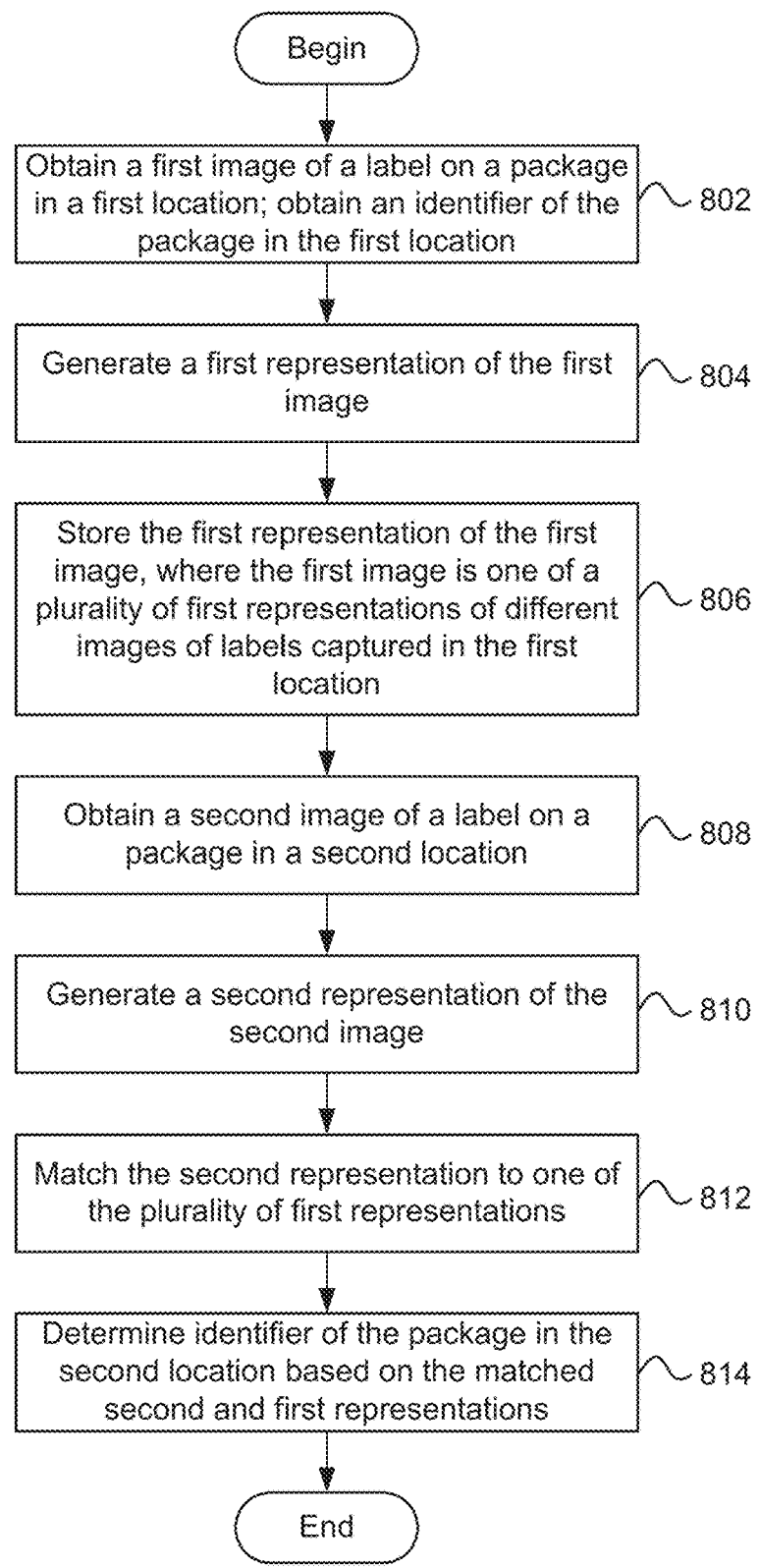
FIG. 8 is a flowchart illustrating a method for performing package identification, according to one embodiment.

FIG. 8 is a flowchart illustrating a method 800 for performing package identification, according to one embodiment. The method 800 may be performed by one or more components of the package identification component 212 and/or one or more components of the package identification component 222.

The method 800 begins at block 802, where the package identification component 212 obtains a first image (e.g., high quality image 602) of a label (e.g., label 204) on a package (e.g., package 202) in a first location (e.g., region 110). For example, the first image may be captured by a camera (e.g., camera 236) on a camera device (e.g., camera device 102) at the first location and sent to the package identification component 212. At block 802, the package identification component 212 also obtains an identifier of the package in the first location. For example, the identifier of the package can be obtained from a barcode on the package that is read by a camera (e.g., camera 236) on a camera device (e.g., camera device 102) at the first location and sent to the package identification component 212.

At block 804, the package identification component 212 generates a first representation (e.g., fingerprint 250) of the first image. At block 806, the package identification component 212 stores the first representation of the first image. In one embodiment, the package identification component 212 sends the first representation of the first image to the package identification component 222. In one embodiment, the first representation of the first image is one of a plurality of first representations of different images of labels captured by the package identification component 212.

At block 808, the package identification component 222 obtains a second image (e.g., low quality image 604) of a label (e.g., label 204) on a package (e.g., package 202) in a second location (e.g., package storage area 120). For example, the second image may be captured by a camera (e.g., camera 234) on a camera device (e.g., camera device 104) at the second location and sent to the package identification component 222. At block 810, the package identification component 222 generates a second representation (e.g., fingerprint 260) of the second image.

At block 812, the package identification component 222 matches the second representation of the second image to one of the multiple first representations of the first images. In one embodiment, the package identification component 222 may determine that the second representation matches the first representation if an amount of differences between the first and second representations is below (or within) a threshold. At block 814, the package identification component 222 determines the identifier of the package in the second location based on the matched second and first representations. For example, the package identification component 222 may determine the identifier of the package in the second location by retrieving the identifier of the package associated with the first representation that matches the second representation. The package identification component 222 can send the identifier of the package to another computing system (e.g., inventor management system) in order to verify a sorting location of the package.

Figure 9:
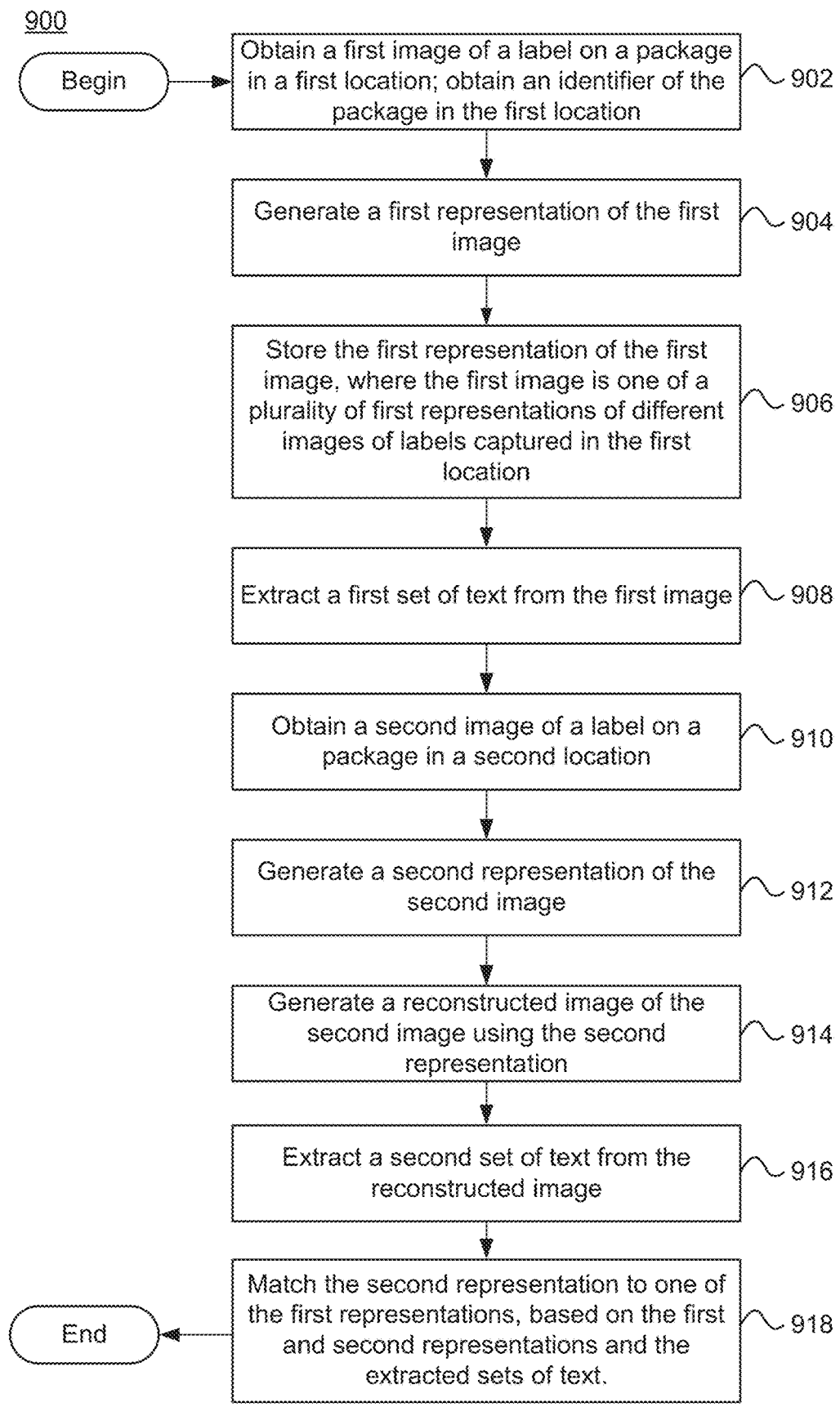
FIG. 9 is a flowchart illustrating another method for performing package identification, according to one embodiment.

FIG. 9 is a flowchart illustrating another method 900 for performing package identification, according to one embodiment. The method 900 may be performed by one or more components of the package identification component 212 and/or one or more components of the package identification component 222.

The method 900 begins at block 902, where the package identification component 212 obtains a first image (e.g., high quality image 602) of a label (e.g., label 204) on a package (e.g., package 202) in a first location (e.g., region 110). For example, the first image may be captured by a camera (e.g., camera 236) on a camera device (e.g., camera device 102) at the first location and sent to the package identification component 212. At block 902, the package identification component 212 also obtains an identifier of the package in the first location. For example, the identifier of the package can be obtained from a barcode on the package that is read by a camera (e.g., camera 236) on a camera device (e.g., camera device 102) at the first location and sent to the package identification component 212.

At block 904, the package identification component 212 generates a first representation (e.g., fingerprint 250) of the first image. At block 906, the package identification component 212 stores the first representation of the first image. In one embodiment, the package identification component 212 sends the first representation of the first image to the package identification component 222. In one embodiment, the first representation of the first image is one of a plurality of first representations of different images of labels captured by the package identification component 212. At block 908, the package identification component 212 extracts a first set of text (e.g. text 706) from the first image.

At block 910, the package identification component 222 obtains a second image (e.g., low quality image 604) of a label (e.g., label 204) on a package (e.g., package 202) in a second location (e.g., package storage area 120). For example, the second image may be captured by a camera (e.g., camera 234) on a camera device (e.g., camera device 104) at the second location and sent to the package identification component 222. At block 912, the package identification component 222 generates a second representation (e.g., fingerprint 260) of the second image. At block 914, the package identification component 222 generates a reconstructed image (e.g., reconstructed image 702) of the second image using the second representation. At block 916, the package identification component 222 extracts a second set of text (e.g. text 704) from the reconstructed image. At block 918, the package identification component 222 matches the second representation of the second image to one of the multiple first representations of the first images, based on the first and second representations, and the extracted sets of text.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the features and elements described herein, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages described herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

The claims remain as follows:

1. A method, comprising:
    capturing a first image of a label on a package with a first camera when the package is in a first location within a warehouse;

generating a first representation of the first image, wherein the first representation is one of a plurality of first representations of first images of labels on a plurality of different packages;

extracting a first set of text from the first image;

capturing a second image of the label on the package with a second camera when the package is in a second location, different from the first location, within the warehouse;

generating a second representation of the second image;

generating a reconstructed image of the second image using the second representation;

extracting a second set of text from the reconstructed image; and matching the second representation of the second image to the first representation of the first image, based on the first and second representations, the first set of text, and the second set of text.

2. The method of claim 1, wherein:

the first location is an area for retrieving packages within the warehouse; and the second location is a pallet for storing packages within the warehouse.

3. The method of claim 1, wherein:

the first representation of the first image is a compressed representation of the first image; and the second representation of the second image is a compressed representation of the second image.

4. The method of claim 1, wherein matching the second representation of the second image to the first representation of the first image comprises determining that an amount of differences between the first representation of the first image and the second representation of the second image satisfies a first threshold.

5. The method of claim 4, wherein matching the second representation of the second image to the first representation of the first image further comprises determining that an amount of difference between the first set of text and the second set of text satisfies a second threshold.

6. The method of claim 1, wherein the first image has a higher quality than the second image.

7. The method of claim 1, wherein the first image and the second image are captured in different operating conditions.

8. A system, comprising:

a first camera configured to capture a plurality of first images, wherein each first image is an image of a label on a different package in a first location in a warehouse;

a second camera configured to capture a second image of a label on a package in a second location in the warehouse;

at least one processor; and a memory storing one or more applications, which, when executed by the at least one processor, performs an operation comprising:

generating a first representation of each of the plurality of first images;

generating a second representation of the second image; and matching the second representation of the second image to one of the first representations of the plurality of first images.

9. The system of claim 8, the operation further comprising determining an identifier of each package in the first location from the first image of the label on the package in the first location, wherein the identifier of each package in the first location is associated with the respective first representation of the first image of the label on the package.

10. The system of claim 9, the operation further comprising determining an identifier of the package placed in the second location based on the matched second and first representations.

11. The system of claim 10, wherein the identifier of the package placed in the second location corresponds to the identifier associated with the one of the first representations that matches the second representation.

12. The system of claim 11, the operation further comprising sending the identifier of the package placed in the second location to at least another computing system.

13. The system of claim 8, wherein the second image has a lower resolution than each of the plurality of first images.

14. A method, comprising:

capturing a plurality of first images at a first location within a warehouse, wherein each first image is an image of a label on a different package in the first location;

generating a first representation of each of the plurality of first images;

capturing a second image of a package placed in a second location within the warehouse;

generating a second representation of the second image; and matching the second representation to one of the first representations.

15. The method of claim 14, further comprising determining an identifier of each package in the first location from the first image of the label on the package in the first location, wherein the identifier of each package in the first location is associated with the respective first representation of the first image of the label on the package.

16. The method of claim 15, further comprising determining an identifier of the package placed in the second location based on the matched second and first representations, wherein the identifier of the package placed in the second location corresponds to the identifier associated with the one of the first representations that matches the second representation.

17. The method of claim 14, wherein matching the second representation of the second image to one of the first representations comprises determining that an amount of difference between the second representation and the one of the first representations satisfies a threshold.

18. The method of claim 14, wherein:

each of the first representations comprises a compressed representation of the first image; and the second representation comprises a compressed representation of the second image.

19. The method of claim 18, wherein:

the compressed representation of each first image comprises a set of features extracted from the first image that identify the first image; and the compressed representation of the second image comprises a set of features extracted from the second image that identify the second image.

20. The method of claim 14, wherein the second image has a lower quality than each of the plurality of first images.

* * * * *